US007002117B2

(12) United States Patent  
Thomasset

(10) Patent No.: US 7,002,117 B2  
(45) Date of Patent: Feb. 21, 2006

(54) HEAT-SEALING DEVICE FOR PACKAGING MATERIAL

(75) Inventor: Jacques Thomasset, Neuvecelle (FR)

(73) Assignee: AISAPACK Holding S.A., Vouvry (CH)

( * ) Notice: Subject to any disclaimer, the term of this patent is extended or adjusted under 35 U.S.C. 154(b) by 0 days.

(21) Appl. No.: 10/498,907

(22) PCT Filed: Dec. 16, 2002

(86) PCT No.: PCT/CH02/00699

§ 371 (c)(1),
(2), (4) Date: Jun. 16, 2004

(87) PCT Pub. No.: WO03/053626

PCT Pub. Date: Jul. 3, 2003

(65) Prior Publication Data

US 2005/0133496 A1    Jun. 23, 2005

(30) Foreign Application Priority Data

Dec. 20, 2001  (CH)  ..................................... 2355/01

(51) Int. Cl.
*H05B 6/02* (2006.01)
*B23K 13/01* (2006.01)
(52) U.S. Cl. ..................... 219/617; 219/613; 156/272.2
(58) Field of Classification Search ................ 219/617, 219/608, 611, 645, 673, 639, 660, 610, 633, 219/612, 613, 672; 156/274.2, 272.2, 380.2, 156/275.1, 272.4, 273.7; 336/62
See application file for complete search history.

(56) References Cited

U.S. PATENT DOCUMENTS

| | | | |
|---|---|---|---|
| 2,632,079 A | | 3/1953 | Body |
| 3,248,512 A | * | 4/1966 | Sommer ...................... 219/610 |
| 3,406,271 A | | 10/1968 | Cachat et al. |
| 3,864,186 A | * | 2/1975 | Balla ........................ 156/272.2 |
| 4,210,477 A | | 7/1980 | Gillespie et al. |
| 4,694,134 A | | 9/1987 | Ross |
| 5,444,220 A | * | 8/1995 | Hansen et al. .............. 219/633 |
| 5,571,437 A | | 11/1996 | Rudd |

FOREIGN PATENT DOCUMENTS

| | | |
|---|---|---|
| FR | 2 073 137 | 1/1980 |
| FR | 2 429 657 | 1/1980 |

* cited by examiner

*Primary Examiner*—Quang Van
(74) *Attorney, Agent, or Firm*—Nixon & Vanderhye P.C.

(57) ABSTRACT

Device for welding a moving packaging material (1) including a layer that can be heated by electromagnetic induction and a thermoplastic layer incorporating a welding zone (2) which lies in the direction of movement of the packaging material; the welding device includes an alternating current generator, a coil (3, 5, 6) for transforming the alternating current into a magnetic field, a ferromagnetic element (7, 8, 10–13) for channeling the magnetic field lines in a specific direction, the magnetic field being oriented so s to cross the packaging material (1) in order to induce heating of the layer that can be heated by electromagnetic induction; the welding device being characterized in that it includes a set of ferromagnetic elements (7, 8, 10–13, 19–21) which are arranged so that the magnetic field lines cross the packaging material (1) in at least two distinct regions (14, 16–18) located along the welding zone (2).

21 Claims, 5 Drawing Sheets

HEAT-SEALING DEVICE FOR PACKAGING MATERIAL

This application is the U.S. national phase of international application PCT/CH02/00699 filed 16 Dec. 2002 which designated the U.S. and claims benefit of CH 2355/01, dated 20 Dec. 2001, the entire content of which is hereby incorporated by reference.

FIELD OF THE INVENTION

The present invention relates to a welding device for packaging material which is moving. The packaging material consists of at least one thermoplastic layer and of a layer (e.g. polymer-based or made of metal) that can be heated by electromagnetic induction. The device comprises an alternating current generator and a coil for transforming the alternating current into a magnetic field. The magnetic field lines are oriented so as to cross the packaging material, thus generating eddy currents in the metal layer, the heat resulting from this phenomenon being used to melt a portion (the welding zone) of the thermoplastic layer.

PRIOR ART

French Patent Application No. 2.073.137 by Tetra Pak presents an inductor for welding tubes containing a ferrite bar, so as to increase the induction in the coil.

French Patent Application No. 2 429 657 by American Can Company presents an inductor for welding tubes characterized in that the internal mandrel, which acts as a guide for the movement of the tubes, comprises over its length a rod of the ferrite type, so as to produce a weld localized over a narrow strip oriented in the direction of movement of the tubes.

The coil is placed around the tube during formation.

U.S. Pat. No. 3,242,300 by Ohio Crankshaft Company describes an inductor for the spiral welding of tubes. Elements of ferrite type are placed on either side of the surface to be welded so as to provide a weld over a continuous curve.

In the devices of the prior art, the magnetic field loops generated by the coil are only partially channelled by means of ferromagnetic elements. The result of this is that some magnetic field lines pass through the packaging material in places which do not correspond to the welding zone. The uncontrolled heating of these regions may generate deformation in the packaging material, e.g. corrugation.

SUMMARY OF THE INVENTION

The present invention has the merit especially of overcoming the aforementioned problem by offering heating which is better targeted in the welding zone. It relates to a device for welding a moving packaging material comprising a layer (e.g. polymer-based or made of metal) that can be heated by electromagnetic induction and a thermoplastic layer incorporating a welding zone which lies in the direction of movement of the packaging material; the welding device comprising an alternating current generator, a coil for transforming the alternating current into a magnetic field, a ferromagnetic element for channelling the magnetic field lines in a specific direction, the magnetic field being oriented so as to cross the packaging material in order to induce heating of the layer that can be heated by electromagnetic induction; the welding device being characterized in that it comprises a set of ferromagnetic elements which are arranged so that the magnetic field lines cross the packaging material in at least two distinct regions located along the welding zone.

As will be seen hereinafter, heating localized in two distinct regions is particularly advantageous.

According to a preferred embodiment of the invention, a first ferromagnetic element is placed on one side of the packaging material, for example on the side of the inner face of the packaging during formation. The first ferromagnetic element is placed such that its two ends are close to the two heating regions. In the extension of these ends, but on the other side of the packaging material, there is respectively a second and a third ferromagnetic element, one of the ends of which is close to the heating regions. The result of this is that around the heating regions, the magnetic field lines are channelled.

According to a particularly advantageous embodiment of the invention, the second and the third ferromagnetic element are connected together via a fourth ferromagnetic element, a coil surrounding either the second, or the third or the fourth ferromagnetic element. The set of elements thus produced forms a ferromagnetic circuit, in this way channelling the magnetic field loops induced by the coil.

It should be pointed out that, unlike the device of the prior art described in U.S. Pat. No. 3,242,300 which exhibits a heating region extending over a curve, the device according to the invention aims to heat two distinct regions. This way of proceeding means that as it moves, the packaging material will undergo, in its welding zone, a first heating followed by an interruption and a second heating.

In order to demonstrate the benefit of a "relaxation" zone, two heating device designs can be compared, the first, as illustrated in U.S. Pat. No. 3,242,300, exhibits. a single heating region extending over a length L, the second, according to the invention, exhibiting a first (lengthways) heating region $L_1$, followed by a (lengthways) interruption region $L_2$ and a (lengthways) heating region $L_3$.

The first device is defined by

L=60 mm

The temperature of the aluminium sheet is set to 140° C. at the inductor outlet. Experimentally, this amounts to adjusting the power supplied to the inductor.

The second device is defined by

L1=30 mm

L2=30 mm

L3=30 mm

The power supplied to the second device is identical to the power supplied to the first device (at equivalent line speed).

The sheet to be welded mainly comprises 3 layers polyethylene/aluminium/polyethylene 150 microns/12 microns/75 microns

| Speed (m/min) | Temperature (° C.) of the interface to be welded at the outlet of the first device | Temperature (° C.) of the interface to be welded at the outlet of the second device |
|---|---|---|
| 20 | 138 | 139 |
| 40 | 126 | 135 |
| 60 | 111 | 124 |
| 80 | 103 | 117 |

The higher the speed of movement, the faster the heat energy has to be supplied. The aluminium sheet heats up virtually instantaneously. On the other hand, the polymer layer is not heated uniformly within its thickness when the speed is high (heat dispersion in the polymer is slower). The transitory "relaxation" zone (L2) allows the heat energy from the aluminium layer to disperse in the polymer and thus to reduce the thermal gradient between the aluminium layers and the interface to be welded.

BRIEF DESCRIPTION OF THE FIGURES

Some non-limiting examples of the invention are described hereinbelow by means of the following figures.

Each element common to each figure bears the same numerical reference.

Figure 1:
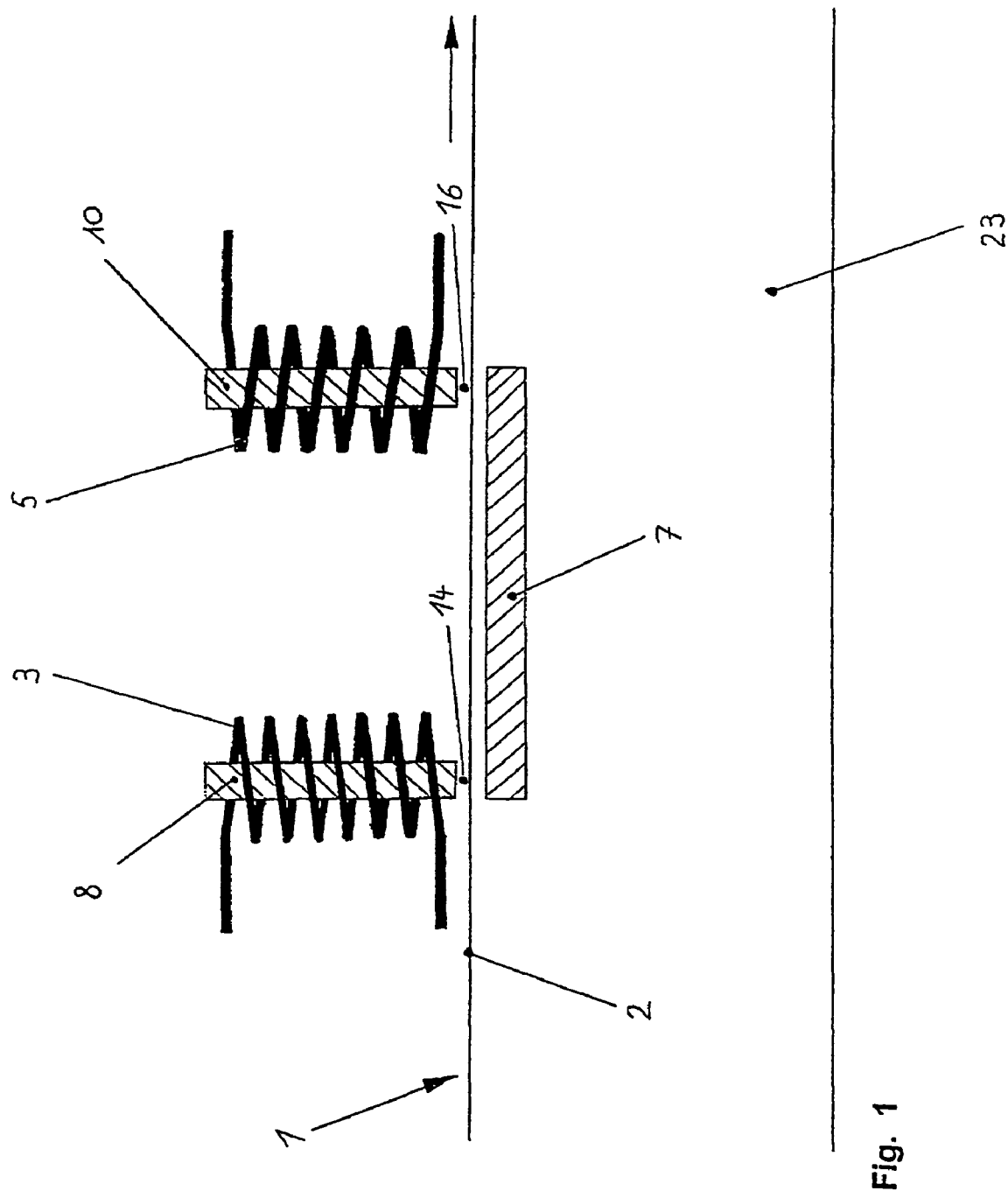
FIG. 1 illustrates a front view of the first embodiment according to the invention.

FIG. 1 shows a tube 1 moving in a heating device. The tube 1 is made from a sheet wound around a welding rod 23, the edges of the sheet are superimposed and welded by heating as they pass through the heating device. The wall of the tube 1 consists of at least one metal layer and one thermoplastic layer. As indicated above, the presence of a metal layer is needed in order to induce heat-generating eddy currents, the latter being used to melt a portion of the thermoplastic layer and thus to provide a weld.

In the present example, a welding zone 2 extends in the direction of movement of the tube 1.

The heating device comprises a first ferromagnetic bar 7, for example made of ferrite, incorporated in the welding rod 23 and placed on the inside of the tube 1, close to the welding zone 2. A second 8 and a third 10 ferromagnetic bar are placed above the first bar 7, so that one end of the second bar 8 is located in the extension of one end of the first bar 7 and that one end of the third bar 10 is located in the extension of the other end of the first bar 7. The second 8 and the third 10 bar are each surrounded by a coil 3, 5.

The arrangement of the three bars 7, 8, 10 in the shape of a U makes it possible to obtain essentially localized heating of the regions 14, 16, the first region 14 being defined between one end of the first bar 7 and one end of the second bar 8, the second region 16 being defined between the other end of the first bar 7 and one end of the third bar 10. The distance formed between these two pairs of ends may vary between 2 and 200 times, and preferably between 2 and 50 times, the thickness of the packaging sheet to be welded.

Thus, for a point located on the tube 1 in its welding zone 2, a first heating takes place in the region 14 located between one end of the first bar 7 and one end of the second bar 8. This is followed by a rest period then new heating in the region 16 located between the other end of the first bar 7 and one end of the third bar 10.

Figure 2:
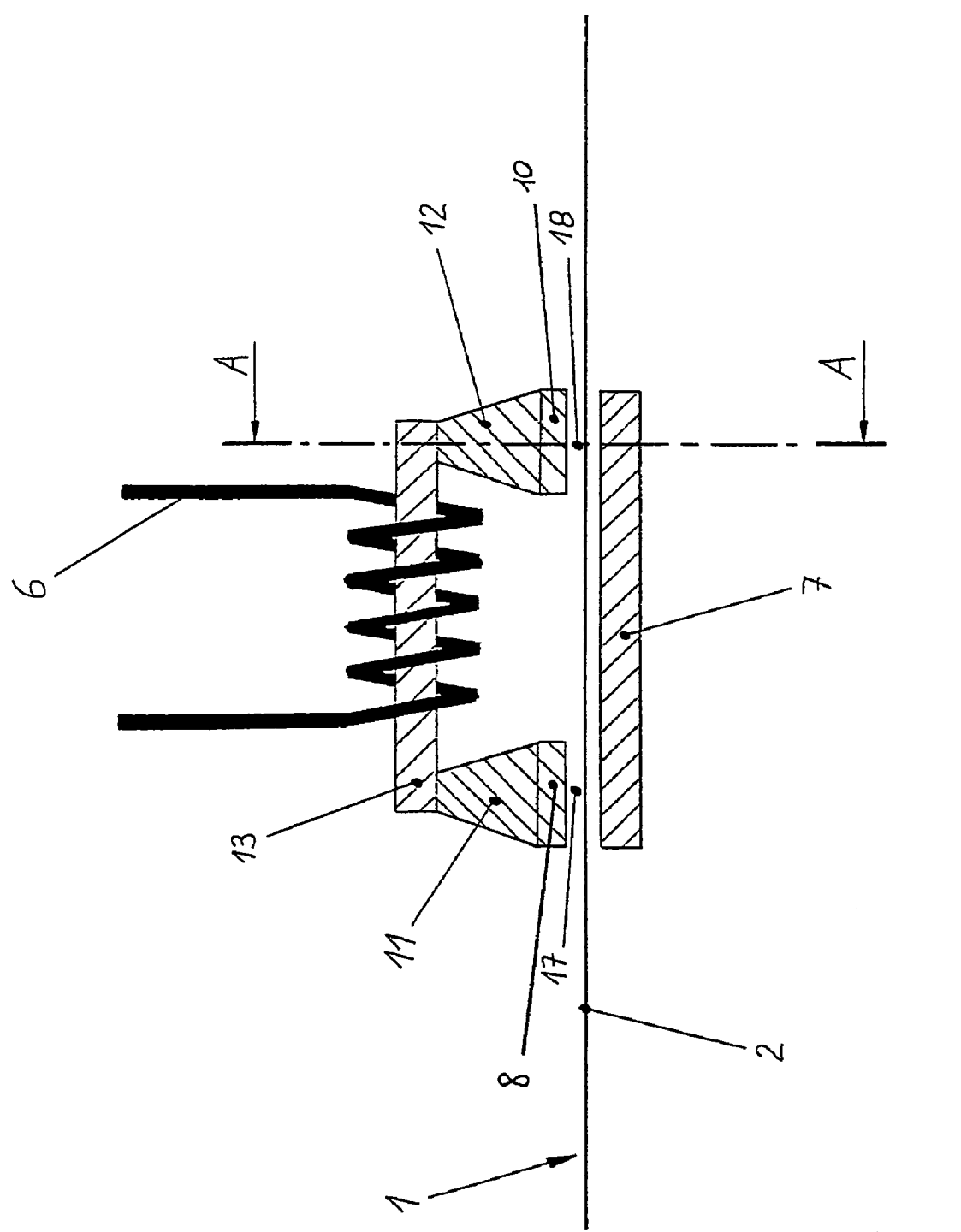
FIG. 2 illustrates a front view of a second embodiment according to the invention.
Figure 3:
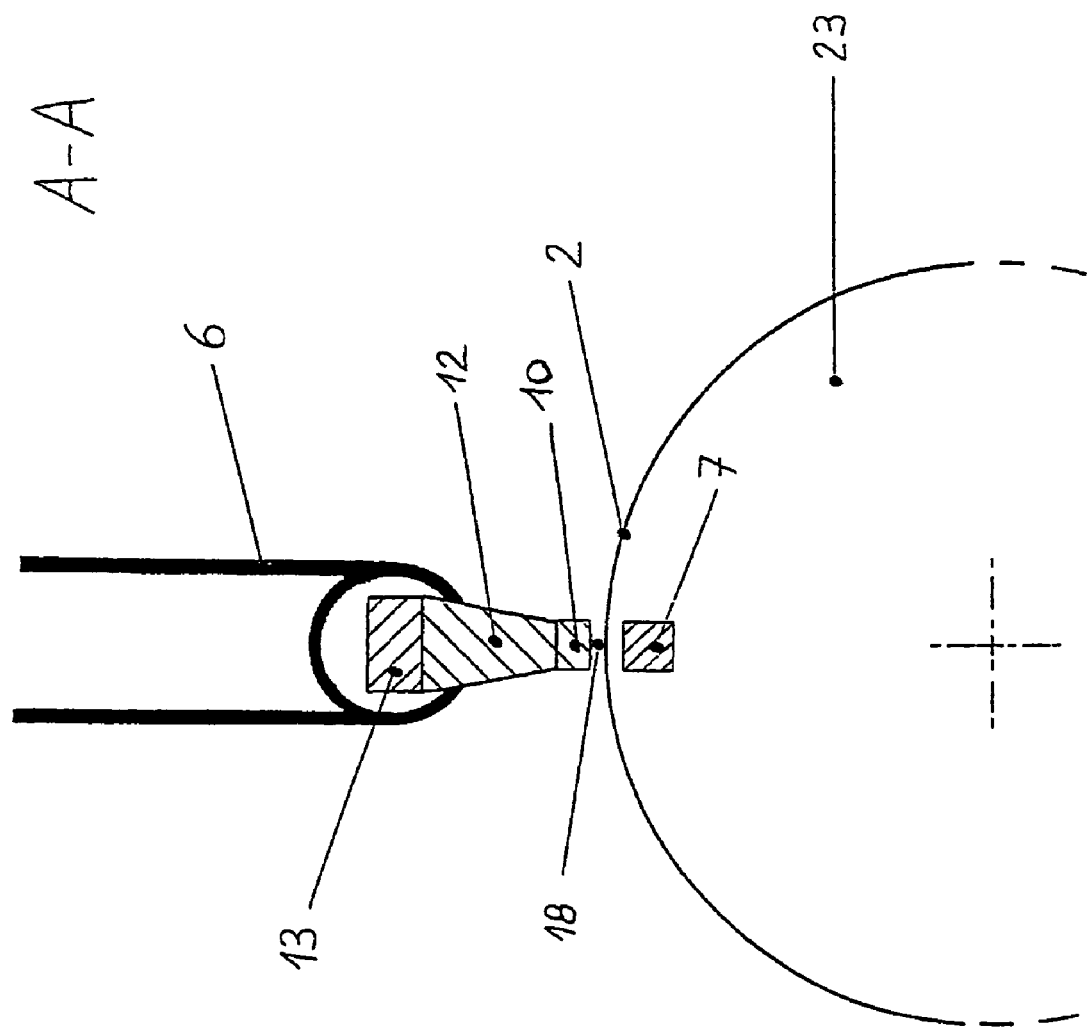
FIG. 3 illustrates a cross section, along the line A—A, of the embodiment of FIG. 2.
Figure 4:
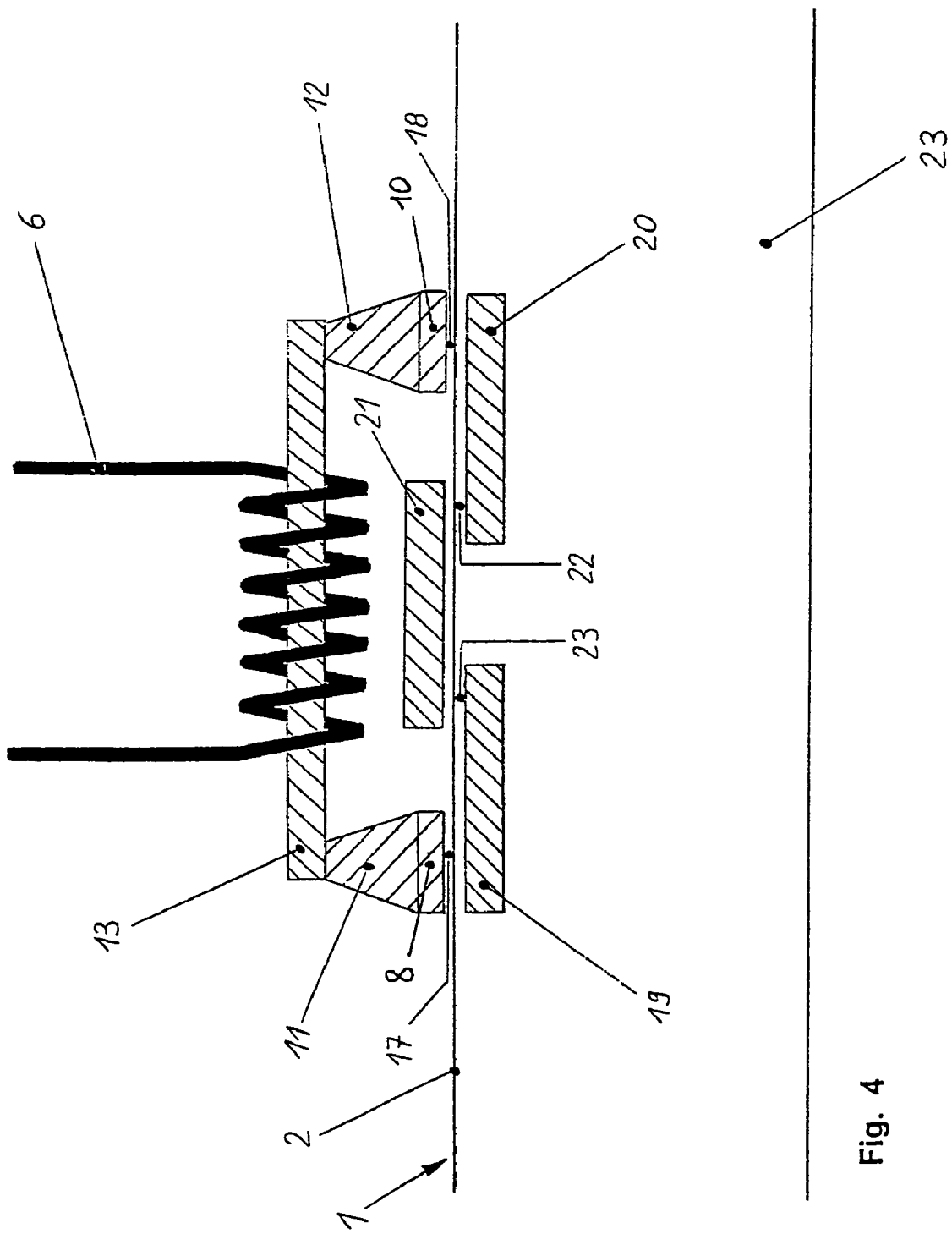
FIG. 4 illustrates a front view of a third embodiment according to the invention.

The devices illustrated in FIGS. 2 to 4 are similar to that of FIG. 1. However, they differ in that the set of ferromagnetic elements form a closed loop, all the loops of the magnetic field lines consequently being channelled.

The second 11 and third 12 ferromagnetic bars are connected together via a fourth bar 13 placed parallel to the direction of movement of the tube 1. The fourth bar is surrounded by a coil 6.

The coil 6 may also be placed around the second 11 or the third 12 ferromagnetic bar.

The device illustrated in FIG. 4 is distinguished from that of FIG. 2 only in that the first bar 7 is replaced by a group of three bars 19–21 placed alternately on each side of the wall of the tube 1, the ends of the bars 19–21 being superimposed in pairs.

The welding rods of the prior art most often consist of a steel core surrounded by a plastic sleeve.

The presence of ferromagnetic bars (7, 19, 21) in the welding rod 23 undoubtedly makes it possible to channel the majority of the magnetic field lines inside the bars.

However, it happens that some field lines also pass through the plastic sleeve, the heating performance in the welding zones consequently being decreased.

In order to minimize, or even eliminate, this drawback, the welding rod 23 may consist exclusively of a material forming a screen, such as copper or aluminium.

Figure 5:
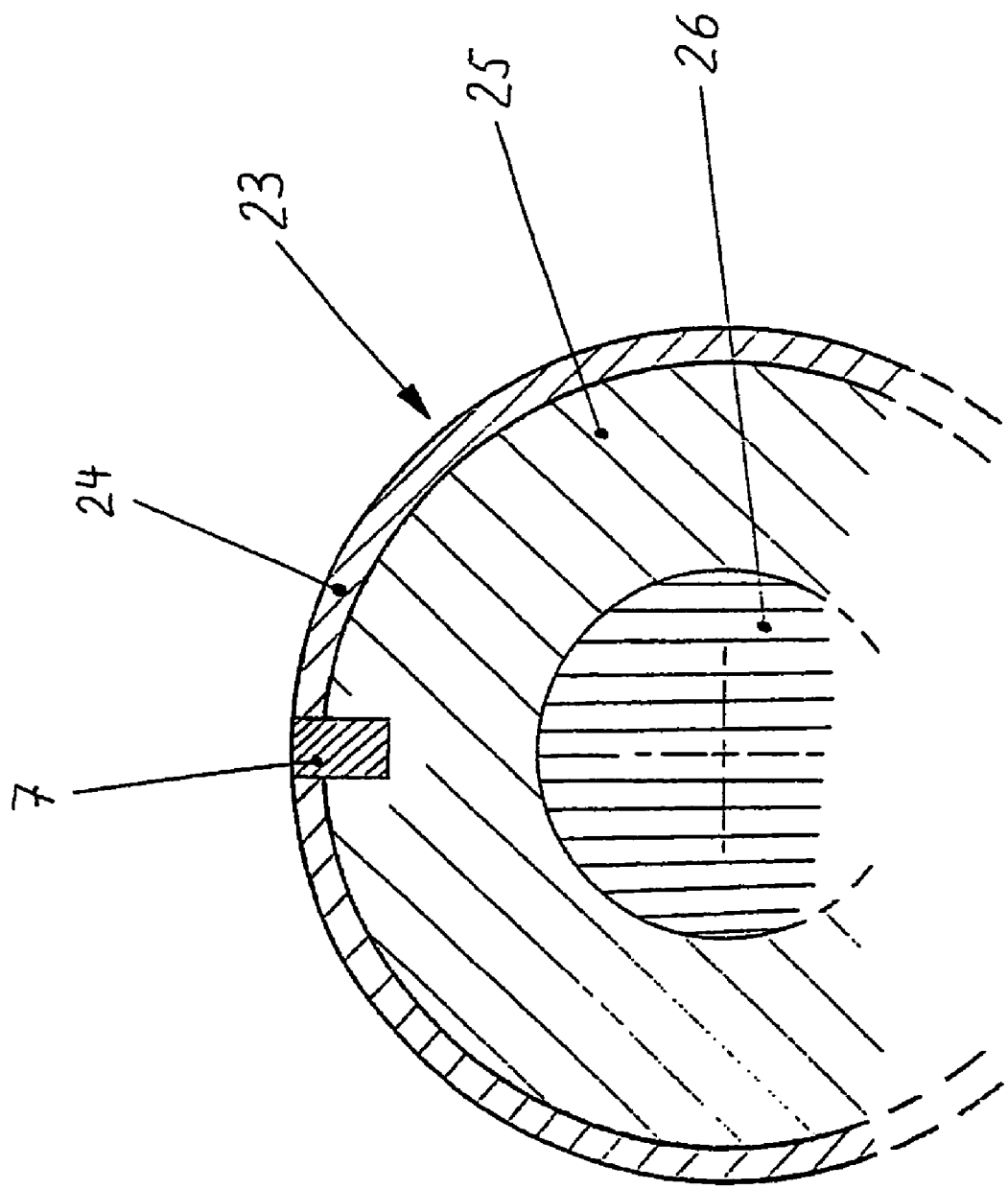
FIG. 5 shows a cross section of a welding rod according to another embodiment of the invention.

Alternatively (see FIG. 5), the rod may comprise a steel core 26 surrounded by a plastic sleeve 25, which is itself surrounded by an envelope 24 made of copper or of aluminium, the ferromagnetic bars (7, 19, 21) being placed exclusively in the outer envelope 24 and in the plastic sleeve 25. The resulting effect is the same as in the previous scenario, that is that the copper or aluminium element acts as a screen for the magnetic field lines.

It should be pointed out that the present invention is applicable to any laminate comprising at least one metal sheet (e.g. made of aluminium) and one thermoplastic sheet.

By way of non-limiting example of laminates that can be used, mention may be made of the following combinations (described from the outside towards the inside of the tube):

1) (White) polyethylene film of 130 microns thickness—(white) polyethylene of 27 microns thickness—(white) copolymer of 16 microns thickness—12-micron aluminium sheet—(transparent) copolymer of 30 microns thickness—special (transparent) polyethylene film of 60 microns thickness.

2) (White) polyethylene of 90 microns thickness—(white) copolymer of 65 microns thickness—aluminium sheet of 40 microns thickness—(transparent) copolymer of 40 microns thickness—special (transparent) polyethylene of 75 microns thickness.

3) (White) polyethylene of 110 microns thickness—(white) copolymer of 45 microns thickness—aluminium sheet of 40 microns thickness—(transparent) copolymer of 40 microns thickness—special (coex) polyethylene of 75 microns thickness.

The invention claimed is:

1. Device for welding a moving packaging material comprising a layer that can be heated by electromagnetic induction and a thermoplastic layer incorporating a welding zone which lies in the direction of movement of the packaging material; the welding device comprising an alternating current generator, a coil for transforming the alternating current into a magnetic field, a ferromagnetic element for channeling the magnetic field lines in a specific direction, the magnetic field being oriented so as to cross the packaging material in order to induce heating of the layer that can be heated by electromagnetic induction; wherein the welding device comprises a set of ferromagnetic elements which are arranged so that the magnetic field lines cross the packaging material in at least two distinct regions located along the welding zone; and wherein a plurality of the ferromagnetic elements are placed alternately close to each side of the packaging material so that each end of a ferromagnetic element is located above or below the end of another ferromagnetic element.

2. A device according to claim 1, wherein a first ferromagnetic element is placed close to one side of the packaging material so that each of its ends is located close to one or the other of the said distinct regions and that a second and third ferromagnetic element are placed on the other side of the packaging material so that one of the ends of the second element is located close to one of the said distinct regions and so that one of the ends of the third element is located close to the other of the said distinct regions.

3. A device according to claim 2, wherein the ends of the three ferromagnetic elements placed close to and on either side of the layer to be welded are separated by a distance representing between 2 and 200 times the thickness of the layer to be welded.

4. A device according to claim 2, wherein the second and the third ferromagnetic elements are surrounded by a coil.

5. A device according to claim 1, wherein the set of ferromagnetic elements forms a ferromagnetic circuit, a coil surrounding a ferromagnetic element.

6. A device according to claim 1, wherein it comprises one or more magnetic screens placed between non-adjacent ferromagnetic elements.

7. A device according to claim 1, wherein part of the ferromagnetic elements is placed in a welding rod, the latter comprising a screen element, placed so as to contain the field lines in those ferromagnetic elements.

8. Device for welding a moving packaging material comprising a layer that can be heated by electromagnetic induction and a thermoplastic layer incorporating a welding zone which lies in the direction of movement of the packaging material; the welding device comprising an alternating current generator, a coil for transforming the alternating current into a magnetic field, a ferromagnetic element for channeling the magnetic field lines in a specific direction, the magnetic field being oriented so as to cross the packaging material in order to induce heating of the layer that can be heated by electromagnetic induction; wherein the welding device comprises a set of ferromagnetic elements which are arranged so that the magnetic field lines cross the packaging material in at least two distinct regions located along the welding zone; and wherein the device comprises one or more magnetic screens placed between non-adjacent ferromagnetic elements.

9. A device according to claim 8, wherein a first ferromagnetic element is placed close to one side of the packaging material so that each of its ends is located close to one or the other of the said distinct regions and that a second and third ferromagnetic element are placed on the other side of the packaging material so that one of the ends of the second element is located close to one of the said distinct regions and so that one of the ends of the third element is located close to the other of the said distinct regions.

10. A device according to claim 9, wherein the ends of the three ferromagnetic elements placed close to and on either side of the layer to be welded are separated by a distance representing between 2 and 200 times the thickness of the layer to be welded.

11. A device according to claim 9, wherein the second and the third ferromagnetic elements are surrounded by a coil.

12. A device according to claim 8, wherein a plurality of the ferromagnetic elements are placed alternately close to each side of the packaging material so that each end of a ferromagnetic element is located above or below the end of another ferromagnetic element.

13. A device according to claim 8, wherein the set of ferromagnetic elements forms a ferromagnetic circuit, a coil surrounding a ferromagnetic element.

14. A device according to claim 8, wherein part of the ferromagnetic elements is placed in a welding rod, the latter comprising a screen element placed so as to contain the field lines in those ferromagnetic elements.

15. Device for welding a moving packaging material comprising a layer that can be heated by electromagnetic induction and a thermoplastic layer incorporating a welding zone which lies in the direction of movement of the packaging material; the welding device comprising an alternating current generator, a coil for transforming the alternating current into a magnetic field, a ferromagnetic element for channeling the magnetic field lines in a specific direction, the magnetic field being oriented so as to cross the packaging material in order to induce heating of the layer that can be heated by electromagnetic induction; wherein the welding device comprises a set of ferromagnetic elements which are arranged so that the magnetic field lines cross the packaging material in at least two distinct regions located along the welding zone; and wherein part of the ferromagnetic elements are placed in a welding rod, the latter comprising a screen element placed so as to contain the field lines in those ferromagnetic elements.

16. A device according to claim 15, wherein a first ferromagnetic element is placed close to one side of the packaging material so that each of its ends is located close to one or the other of the said distinct regions and that a second and third ferromagnetic element are placed on the other side of the packaging material so that one of the ends of the second element is located close to one of the said distinct regions and so that one of the ends of the third element is located close to the other of the said distinct regions.

17. A device according to claim 16, wherein the ends of the three ferromagnetic elements placed close to and on either side of the layer to be welded are separated by a distance representing between 2 and 200 times the thickness of the layer to be welded.

18. A device according to claim 16, wherein the second and the third ferromagnetic elements are surrounded by a coil.

19. A device according to claim 15, wherein a plurality of the ferromagnetic elements are placed alternately close to each side of the packaging material so that each end of a ferromagnetic element is located above or below the end of another ferromagnetic element.

20. A device according to claim 15, wherein the set of ferromagnetic elements forms a ferromagnetic circuit, a coil surrounding a ferromagnetic element.

21. A device according to claim 15, wherein it comprises one or more magnetic screens placed between non-adjacent ferromagnetic elements.

* * * * *